Figure 1:
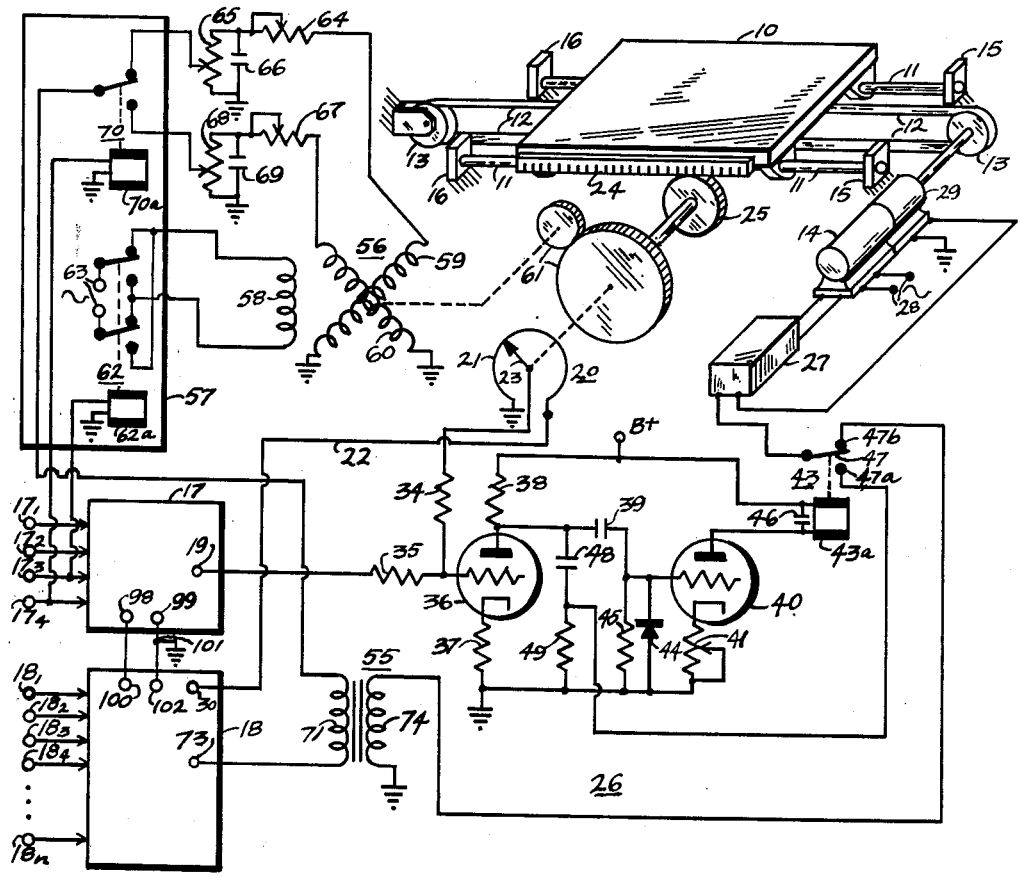

Nov. 13, 1962     T. J. DOSCH     3,064,168
DIGITALLY CONTROLLED COARSE-FINE POSITIONING SYSTEM
Filed June 19, 1958     3 Sheets-Sheet 1

INVENTOR.
Thomas J. Dosch
BY
C. F. Spencer
AGENT

Nov. 13, 1962

T. J. DOSCH 3,064,168

DIGITALLY CONTROLLED COARSE-FINE POSITIONING SYSTEM

Filed June 19, 1958

3 Sheets-Sheet 3

INVENTOR.
Thomas J. Dosch
BY
B. F. Spencer
AGENT

United States Patent Office 3,064,168
Patented Nov. 13, 1962

3,064,168
DIGITALLY CONTROLLED COARSE-FINE POSITIONING SYSTEM
Thomas J. Dosch, Huntington, N.Y., assignor to Reeves Instrument Corporation, Garden City, N.Y., a corporation of New York
Filed June 19, 1958, Ser. No. 743,033
15 Claims. (Cl. 318—28)

This invention relates to positional control systems, and in particular to apparatus for automatically positioning a movable object in response to digital input signals.

Closed-loop control systems using punched cards, magnetic tape, and similar digital input media are widely used for the accurate positioning of machine tools and other precision equipment. In general, these systems require one or more measuring devices to indicate the position of the movable machine member along its axis of displacement, circuitry for comparing the positional indication with the input data, and apparatus for translating the movable machine member to the desired position.

The choice of measuring device is of primary importance in determining both the overall performance of a given system and the complexity of the comparison circuits. In one feedback system an induction potentiometer, having its rotor coupled to the object to be positioned, is switched sequentially between taps on an autotransformer as a movable member is driven toward its final position. The voltage impressed across the autotransformer is proportional to the total displacement of the member and the voltage at each tap corresponds to a fractional portion of this total displacement. The overall accuracy of such a system is necessarily limited since it is proportional to the accuracy with which the output voltage is generated.

To provide improved system accuracy with components of a given accuracy, induction type resolvers and synchros have been applied in many coarse-fine systems to provide continuous and highly accurate feedback data. One such system is shown and described in copending application S.N. 626,239, filed December 4, 1956, now United States Patent No. 2,889,508, issued June 2, 1959, and assigned to the same assignee as the present invention. These transducers are generally excited by alternating voltages having instantaneous magnitudes proportional to the sine and cosine functions of the desired displacement of the machine member, their rotors being driven to a null at an angle corresponding to the desired position of the machine member. The equipment required to generate the necessary sine-cosine functions is relatively elaborate, however, and the space requirements and cost are correspondingly high.

Accordingly, the principal object of this invention is to provide an improved positional control system.

Another object is to provide an improved, relatively low cost, coarse-fine positional control system responsive to digital input signals.

Still another object is to provide a coarse-fine positional control system having good resolution and accuracy in which the output of the fine transducer is selectively controlled by the coarse component of a digital input signal.

Yet another object is to provide a positional control system in which the output voltage of the fine transducer is a linear function of the displacement of the movable member and its polarity and phase are selectively controlled by the coarse component of a digital input signal.

The foregoing objects are achieved by this invention which includes both coarse and fine positioning systems controlled by a digital input signal. In the coarse positioning system the most significant digits, or coarse component, of the input signal are converted to a coarse analog signal voltage and compared with the output voltage from a coarse transducer. The coarse transducer produces a voltage proportional to the absolute position of the machine member, and the difference between this voltage and the coarse analog voltage is used to displace the machine member to approximately the desired position.

In the fine positioning system, the least significant digits, or fine component, of the input signal are converted to a fine analog signal voltage for comparison with the output voltage from a fine transducer. The fine transducer which is provided with a plurality of output circuits replaces the coarse transducer when the error signal falls below a predetermined value. The voltage from a selected output circuit is compared with the fine analog signal voltage and the difference between the two voltages used to accurately displace the machine member to the final desired position. The particular output circuit used for each increment of distance along the total travel of the machine member and the polarity or phase of the output circuit voltage is determined solely by the coarse component of the input signal. The voltage range of each output circuit corresponds to the distance between the closest finite positions obtainable with the coarse positioning system alone.

In one embodiment of the invention a linear induction potentiometer, having a stator winding and a pair of perpendicular rotor output windings, is used as the fine transducer. Switching circuits, energized by the coarse component of the input signal, select the proper output winding and its polarity and phase for each desired setting of the movable machine member.

Figure 3:
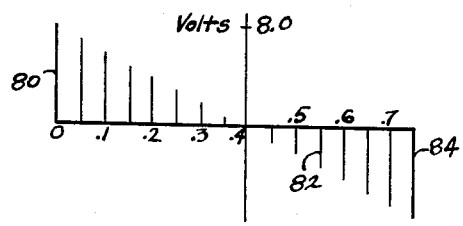
Figure 4:
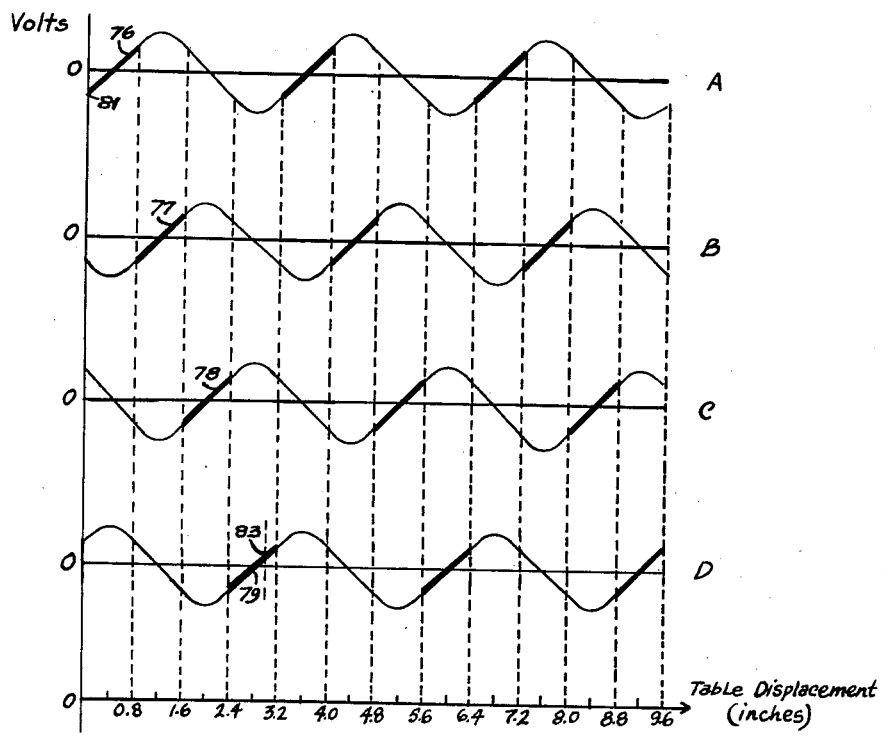
Figure 5:
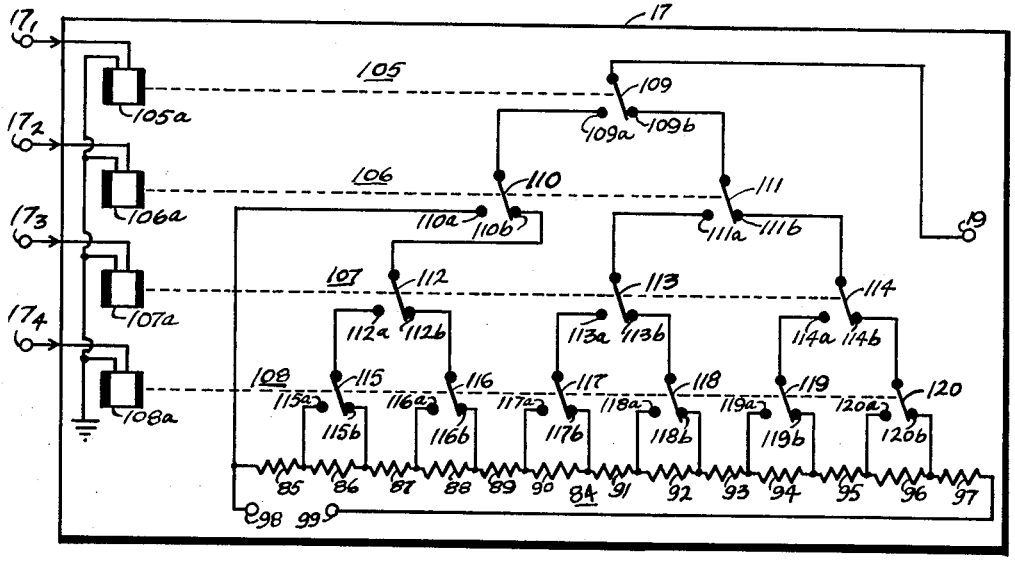
Figure 6:
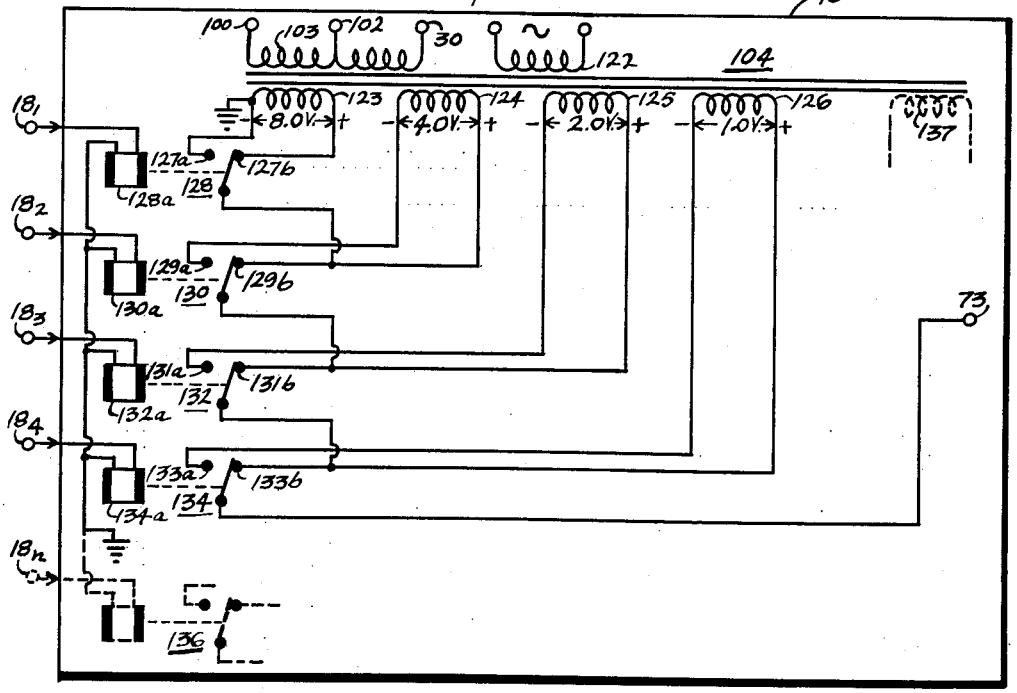

The above objects and the brief introduction to the present invention will be more fully understood and its further objects and advantages will become apparent from a study of the following detailed descriptions in connection with the drawings wherein:

FIG. 1 depicts schematically one embodiment of the positional control system in accordance with the invention, FIG. 2 is a chart showing the relationship between the input signals applied to a coarse digital-to-analog converter and the displacement of the machine member, FIG. 3 is a plot of the output voltage of the fine digital-to-analog converter as a function of the input signal, FIG. 4 shows curves representing the change in the output voltages from the fine transducer with the displacement of the machine member, FIG. 5 is a schematic representation of one form of coarse digital-to-analog converter which may be used in conjunction with the invention, and, FIG. 6 is a schematic representation of one form of fine digital-to-analog converter which may be used in conjunction with the invention.

Referring to FIG. 1, there is shown a movable table 10 arranged for translation along slides 11 by means of a belt 12 driven through pulleys 13 by a two-phase motor 14. A gear reduction unit may be used to couple the shaft of motor 14 to the drive pulley, if desired. A pair of limit stops 15 restrict travel of table 10 to the right while a second pair of stops 16 limit displacement to the left. When the left end of table 10 is positioned against stops 16, the table is arbitrarily considered as being in its zero reference position and all displacements to the right are measured from this reference. Table 10 may be the working surface of a drilling machine, horizontal jig borer, or other mechanism requiring accurate positioning. In general, the table will be adapted for movement along two or more axes, separate positioning equipment being required for each axis. In FIG. 1, translation along only one axis is indicated to avoid complicating the drawing and to more clearly illustrate the invention.

The position of table 10 is controlled by a binary input signal applied to input terminals $17_1$–$17_4$ of coarse digitalto-analog converter 17 and to input terminals $18_1$–$18_n$ of fine digital-to-analog converter 18 by means of punched cards, magnetic tape or any other suitable input device. The magnitude of the input command signal is expressed by the presence or absence of suitable voltages on each of the input terminals. These voltages are transformed as will be explained hereafter by converters 17 and 18 to analog voltages corresponding to the desired position of table 10.

Coarse digital-to-analog converter 17 is adapted to receive the most significant digits, or coarse component, of the input signal and transforms this component into an analog voltage appearing between output terminal 19 and ground. The voltage on terminal 19 is compared with a coarse feedback voltage obtained from a linear potentiometer 20 having one end of its resistive element 21 grounded and the other end connected through lead 22 to terminal 30 which is coupled to a source of alternating voltage located within converter 18. The arm 23 of potentiometer 20 is geared to a precision rack 24 affixed to one edge of table 10. The diameter of pinion 25 is selected to permit arm 23 of potentiometer 20 to traverse essentially the complete length of the potentiometer element 21 during translation of table 10 between stops 15 and 16.

The output voltage of converter 17 and of potentiometer 20 is applied to a comparator circuit 26, and the difference, or coarse error voltage is coupled through servo amplifier 27 to two-phase motor 14, thereby driving table 10 toward the desired position. A reference voltage, which is 90° out of phase with the output voltage of amplifier 27, is applied across motor terminals 28. A tachometer 29, coupled to the shaft of motor 14 and mounted within the same case, has its output voltage connected back to the input of amplifier 27 to provide rate feedback for the servo.

Potentiometer arm 23 and coarse converter output terminal 19 are coupled through resistors 34 and 35 respectively to the grid of triode amplifier tube 36. The cathode of triode 36 is connected through a resistor 37 to ground while the plate is connected to a suitable source of positive potential through load resistor 38. The plate of triode 36 is coupled through a capacitor 39 to the grid of triode 40, triode 40 having a potentiometer 41 connected between its cathode and ground and the coil 43a of a relay 43 connected between its plate and B+. When the difference in magnitude between the voltages applied to resistors 34 and 35 is comparatively large, relay coil 43a will be energized by the plate current of triode 40. When the magnitude of the difference, or error voltage, decreases below a predetermined value, the relay coil will be deenergized. The setting of potentiometer 41 establishes the error voltage which will just cause relay 43 to drop out.

In order to insure that relay 43 will pick up and drop out at the proper times, coarse digital-to-analog converter 17 is designed to produce an output voltage proportional to the desired displacement of table 10 plus one-half the distance represented by the least significant digit of the coarse system. Since the output of coarse potentiometer 20 is proportional to the actual displacement of table 10, the null of the coarse system occurs midway between the points represented by the coarse digital input data thereby reducing the accuracy requirements of comparator circuit 26. The same result could be obtained by adding a portion of the output voltage of fine digital-to-analog converter 18 to the outputs of coarse converter 17 and potentiometer 20 at the grid of triode 36. In this latter case, the coarse error voltage would be substantially zero when table 10 is in the desired position.

A diode 44, in parallel with resistor 45, is coupled between the grid of triode 40 and ground. Diode 44 permits a voltage to be built up across resistor 45 only when the grid voltage of triode 40 is positive with respect to ground thereby providing an amplified half-wave rectified current through relay coil 43a. Capacitor 46 is connected across coil 43a to reduce the A.-C. current component in the coil.

When the voltage applied to the grid of triode 40 is of sufficient magnitude to cause plate current to flow, relay 43 is energized connecting relay arm 47 to contact 47a. The coarse error voltage at the plate of triode 36 is then coupled through a network comprising capacitor 48 and resistor 49 to the input of amplifier 27 for positioning table 10.

To illustrate coarse positioning of the table, assume that a voltage applied to terminal $17_1$ represents a signal to displace the table 6.4 inches to the right of limit stops 16, that a voltage applied to terminal $17_2$ corresponds to a desired displacement of 3.2 inches from stops 16, a voltage on terminal $17_3$ a displacement of 1.6 inches, and a voltage on terminal $17_4$ a displacement of 0.8 inch. Thus, if voltages are applied to terminals $17_4$ and $17_3$, corresponding to increments of 0.8 and 1.6 inches respectively, the table will be driven by motor 27 toward a point 2.4 inches to the right of limit stops 16.

The chart of FIG. 2 depicts graphically which of the terminals $17_1$–$17_4$ must be energized to provide analog voltages at output terminal 19 corresponding to displacement signals between 0 and 9.6 inches in increments of 0.8 inch.

As the table 10 nears the selected position, the magnitude of the voltage on potentiometer arm 23 will approach the magnitude of the coarse analog signal voltage at terminal 19 of converter 17 and the error voltage controlling relay 43 will decrease. As previously explained, the error voltage which will cause relay 43 to drop out is controlled by the setting of potentiometer 41. Potentiometer 41 is adjusted so that with a signal on the grid of triode 40 corresponding to a difference between the actual table displacement and the output of the coarse digital-to-analog converter 17 equivalent to slightly less than 0.4 inch, the plate current will be below the value required to maintain the relay energized. With relay 43 deenergized, relay arm 47 will be disconnected from contact 47a and be connected to contact 47b thus transferring from the coarse positioning system to the fine positioning system.

The fine positioning system comprises fine digital-to-analog converter 18, comparison transformer 55, and linear induction potentiometer 56 together with associated switching circuits 57. The linear induction potentiometer 56 includes a stator winding 58 and a pair of mutually perpendicular rotor windings 59 and 60. Rotor windings 59 and 60 are mechanically coupled to rack 24 by gears 61, the gear ratio being selected so that windings 59 and 60 rotate through 90 mechanical degrees for each 0.8 of an inch displacement of table 10. The rotor windings 59, 60 on induction potentiometer 56 are each arranged to produce an output voltage having an amplitude which changes linearly as the rotor is displaced plus or minus 45° from its null position. A typical, commercially available, linear induction potentiometer having the requisite linearity and voltage range is the type P600-Mod 10 manufactured by the Reeves Instrument Corporation.

The stator or primary winding 58 of potentiometer 56 is excited, through the contacts of a reversing relay 62, by a properly phased alternating voltage source connected to terminals 63. The coil 62a of reversing relay 62, is operated whenever an input voltage is applied to terminal $17_3$ of coarse digital-to-analog converter 17 thereby reversing the phase of the voltage across stator winding 58. The phase of the output voltages across the rotor or secondary windings 59 and 60 are also reversed when the phase of the stator voltage is switched.

One end of rotor winding 59 is grounded while the other end is connected through a phase shifting and amplitude adjustment network comprising potentiometers 64 and 65 and capacitor 66. Similarly, rotor winding 60 has one end grounded and the other connected to a second phase shifting and amplitude adjustment network comprising potentiometers 67, 68 and capacitor 69. These networks compensate for any phase shift present in induction potentiometer 56 and permit adjustment of the amplitude of the rotor output voltages.

A transfer relay 70 couples either rotor winding 59 or rotor winding 60 to one end of the primary winding 71 of comparison transformer 55. When transfer relay coil 70a is deenergized, rotor winding 59 is connected to transformer primary 71. When relay coil 70a is energized, by application of a voltage to terminal $17_4$ of converter 17, winding 60 is connected to transformer primary 71. The other end of primary 71 is coupled to the output terminal 73 of fine digital-to-analog converter 18. The secondary winding 74 of comparison transformer 55 has one terminal connected to contact 47b of relay 43 while the other secondary terminal is grounded.

The operation of the fine positioning system may best be described by assuming that an input voltage applied to terminal $18_1$ corresponds to a desired displacement of table 10 of 0.4 inch. It shall be noted that this displacement is exactly one-half of the smallest displacement (0.8 inch) represented by a voltage applied to converter 17. Similarly, a voltage applied to terminal $18_2$ corresponds to a desired displacement of 0.2 inch, a voltage applied to terminal $18_3$ to a desired displacement of 0.1 inch, and a voltage applied to terminal $18_4$ to a desired displacement of 0.05 inch. The dotted line between input terminals $18_4$ and $18_n$ indicates that additional input terminals may be included as part of fine digital-to-analog converter 18 if the positioning of table 10 in still smaller increments is desired. A voltage applied to terminal $18_n$ corresponds to the smallest increment of distance to which the table can be accurately set. Voltages applied to terminals located between $18_n$ and $18_4$ will produce displacements corresponding to binary multiples of this smallest increment of distance. It should be noted that the binary system illustrated is by way of example only, and that any other suitable coded input system may be used in conjunction with the subject invention.

FIG. 3 depicts a plot of the amplitude of the voltage between output terminals 73 of fine digital-to-analog converter 18 and ground as a function of the input signal applied to terminals $18_1$–$18_4$. With terminal $18_1$ energized, there is zero voltage present at output terminal 73 corresponding to a displacement of 0.4 inch. With all of the terminals $18_1$–$18_4$ deenergized at a given instant of time, a voltage 80 corresponding to zero displacement appears at output terminal 73, and with all of the terminals $18_1$–$18_4$ energized a voltage 84 of opposite phase is present at terminal 73. The amplitude of the output voltages representing displacements from zero to 0.75 inch inclusive are linearly related, as shown, and each is obtained by energizing the proper combination of input terminals $18_1$–$18_4$. Details of the coarse and fine digital-to-analog converters will be described hereinafter in connection with FIGS. 5 and 6.

FIGS. 4A–4D illustrate the waveforms of the voltages across linear induction potentiometer rotor windings 59 and 60 as a function of the position of table 10 for various input displacement signals. FIGS. 4A and 4B are the voltage waveforms across rotor windings 59 and 60 respectively for input displacement signals between 0 and 1.6 inches, 3.2 and 4.8 inches, and 6.4 and 8.0 inches. Reference to the chart of FIG. 2 will show that, for these displacement ranges, input terminal $17_3$ is not energized and, therefore, reversing relay 62 is in the position shown in FIG. 1. FIGS. 4C and 4D depicts the voltage waveform across the rotor windings 59 and 60 respectively, when the input displacement signal is between 1.6 and 3.2 inches, 4.8 and 6.4 inches, and 8.0 and 9.6 inches. For input signals in these ranges, terminal $17_3$ is energized, picking up reversing relay 62, thereby reversing the phase of the voltages across rotor windings 59 and 60.

The output voltage across each of the rotor windings 59 and 60 is zero whenever the rotor winding is oriented at right angles to stator winding 58. The voltage varies linearly as the rotor is turned 45° to either side of the null becoming non-linear as it passes through its maximum value. Since the smallest increment of displacement which can be set with coarse digital-to-analog converter 17 alone is 0.8 inch, each linear output voltage segment extends over this distance.

The rotor of induction potentiometer 56 is adjusted with respect to table 10 so that the voltage across winding 59 passes through its first null when table 10 is displaced 0.4 inch to the right of limit stops 16. The voltage across rotor winding 60 passes through its first null when the table is located 1.2 inches to the right of stops 16.

At a given instant of time, the alternating output voltage of fine digital-to-analog converter 18 is of one phase for fine digital input signals equal to less than 0.4 inch and of opposite phase for input signals from 0.4 to 0.75 inch. Therefore, in order to provide a zero error signal at the input of amplifier 27 when table 10 is correctly positioned, the output voltage of induction potentiometer 56 must have a phase opposite to that of converter 18. This condition is obtained by using only the portions of the output voltage of induction potentiometer 56 which have a positive linear slope, as shown in the heavy lines in the waveforms of FIG. 4, and adjusting the magnitudes of the rotor output voltages to equal the corresponding analog voltages at the output of converter 18.

The amplitude and phase of the rotor voltages may be modified by adjusting resistors 64, 65 and 67, 68. A rotor output winding which has a positive slope when the desired table position is reached is achieved by switching from one rotor winding to the other in accordance with the coarse input signal. Thus, referring to FIGS. 1, 2, and 4, it is seen that for input displacement signals between 0 and 0.8 inch, relays 62 and 70 are deenergized, and the voltage (FIG. 4A) across rotor winding 59 is connected to the top of primary winding 71 of comparison transformer 55. For displacement signals between 0.8 and 1.6 inches, relay 62 remains deenergized, relay 70 is energized, and the voltage of FIG. 4B across rotor winding 60 is coupled to comparison transformer 55. For displacement signals between 1.6 and 2.4 inches, relay 62 is energized reversing the phase of the rotor output voltages, relay 70 is deenergized, and the voltage (FIG. 4C) across rotor winding 59 provides the feedback voltage. For displacement signals between 2.4 and 3.2 inches, both relays 62 and 70 are energized and the voltage across rotor winding 60 is coupled with reversed phase to comparison transformer 55. Linear voltage segments 76, 77, 78, and 79 thus provide the feedback voltages for input displacement signals of 0–0.8, 0.8–1.6, 1.6–2.4 and 2.4–3.2 inches respectively as table 10 approaches the desired position. This switching is repeated, as shown in the chart of FIG. 2 and the waveforms of FIG. 4, for the entire displacement of table 10.

With table 10 in its zero reference position against stops 16 and all of the input terminals $17_1$–$17_4$ and $18_1$–$18_n$ deenergized, the input voltage to triode 36 is too small to pick up relay 43, and relay arm 47 is, therefore, touching contact 47b. The voltage at fine digital-to-analog coverter output terminal 73 has the value shown at 80 (FIG. 3) which is equal in magnitude and opposite in phase to the voltage 81 (FIG. 4A) obtained from induction potentiometer rotor winding 59.

Assume now, by way of example, that it is desired to precisely position table 10 to a location 2.95 inches to the right of the zero reference. The distance 2.95 inches may be expressed as the sum 1.6+0.8+0.4+0.1+0.05. This displacement signal is obtained by energizing input terminals $17_3$ and $17_4$ of coarse digital-to-analog converter 17 and terminals $18_1$, $18_3$ and $18_4$ of fine digital-to-analog converter 18. When these input terminals are energized, the voltage at output terminal 19 of digital-to-analog converter 17 will be proportional to a displacement of 2.8 inches. Error voltages will therefore, appear at the grids of triodes 36 and 40 thereby energizing relay 43 which picks up when the error voltage corresponds to a displacement in excess of 0.4 inch. The amplified error voltage will be coupled from the plate of triode 36 through capacitor 48 and contact 47a of relay 43 to amplifier 27. Amplifier 27 will then drive motor 14 in the direction required to move table 10 toward the right, the error signal being reduced as the voltage on potentiometer arm 23 approaches the output voltage of coarse digital-to-analog converter 17. When the difference between the feedback voltage applied to resistor 34 and the coarse signal voltage applied to resistor 35 is proportional to a displacement signal of just under 0.4 inch, relay 43 will drop out and the secondary winding 74 of comparison transformer 55 will be connected through contact 47b to amplifier 27. The voltage 82 (FIG. 3) at the output of fine digital-to-analog converter 18 will be proportional to 0.55 inch and this voltage will be opposed in primary windings 71 of comparison transformer 55 by the output voltage 83 (FIG. 4D) of winding 60 when the table is positioned to the selected location.

In the embodiment of the invention described, the phase of the induction potentiometer output voltages is reversed by reversing the direction of current through the stator, or primary, winding 58. In other forms of the invention, the connection to each of the rotor windings 59 and 60 may be independently switched or, as a second alternative, the phase of the output voltage of fine digital-to-analog converter 18 may be reversed.

Coarse digital-to-analog converter 17 employs the circuits shown in FIG. 5 to convert digital signals applied to input terminals $17_1$–$17_4$ to corresponding analog voltages at output terminal 19. A voltage divider 84 comprising series connected resistors 85–97 has one end connected to terminal 98 and the other end to terminal 99. As shown in FIG. 1, terminal 98 is connected directly to terminal 100 in fine digital-to-analog converter 18 while terminal 99 is connected by grounded lead 101 to terminal 102. Terminal 100 is joined to one end of secondary winding 103 of power transformer 104 while terminal 102 is coupled to the center tap of the winding. The other end, terminal 30, of winding 103 is connected by lead 22 to potentiometer 20 so that the voltage across potentiometer 20 will always be equal to the voltage across divider 84 and of opposite phase.

The voltages present at the junctions of resistors 85–97 are selectively coupled to output terminal 19 by means of a relay tree comprising relays 105–108. Relay coils 105a–108a each have one lead connected to terminals $17_1$–$17_4$ respectively, the other lead of each relay coil being grounded. Relay 105 is provided with a single contact arm 109 and a pair of stationary contacts 109a, 109b while relay 106 has a pair of contact arms 110 and 111 each having a pair of stationary contacts 110a, b and 111a, b respectively. Relay 107 has three contact arms 112–114 with respective contacts 112a, b–114a, b while relay 108 has six contact arms 115–120 with associated contacts 115a, b–120a, b. Stationary contacts 115a, b–120a, b are each connected to one of the junctions between resistors 85–97 while contact arms 115–120 are each connected to one of the stationary contacts 112a, b–114a, b. Contact arms 112–114 are coupled to stationary contacts 110b, 111a, and 111b respectively while contact 110a is connected to the junction between resistor 85 and terminal 98. Contact arms 110 and 111 are connected to stationary contacts 109a and 109b while arm 109 is coupled to output terminal 19.

Referring to FIG. 2 it will be noted that, for a zero displacement signal, terminals $17_1$–$17_4$ are deenergized. This is the operating condition shown in FIG. 5 where a direct electrical path exists between the junction of resistors 96 and 97, through contact 120b, arm 120, contact 114b, arm 114, contact 111b, arm 111, contact 109b, and arm 109 to output terminal 19. Thus, the voltage across resistor 97 appears at output terminal 19 for a zero displacement command signal. Arm 23 of potentiometer 20 is adjusted under this condition so that a zero signal will appear at the grid of triode 36 when the table displacement is 0.4 inch.

Referring again to FIG. 2, it is seen that for a displacement of 0.8 inch, terminal $17_4$ is energized picking up relay coil 108a and connecting the junction of resistors 95 and 96 to terminal 19. For a displacement of 1.6 inches, relay coil 107a is energized by application of a voltage to terminal $17_3$ thereby coupling the junction of resistors 94 and 95 to terminal 19. In the same way, input terminals $17_1$–$17_4$ may be energized in accordance with the chart of FIG. 2 to produce displacement signals between 2.4 and 9.6 inches in 0.8 inch increments.

Fine digital-to-analog converter 18, illustrated in FIG. 6, includes power transformer 104 which is excited from an applied alternating voltage connected across primary winding 122. Four secondary windings 123–126 are provided, each having relative polarities as shown and turns ratios which are binary multiples of each other. Thus, secondary winding 123 which has its grounded end connected to the stationary contact 127a and its other end to contact 127b of relay 128 produces 8.0 volts; winding 124, connected to stationary contacts 129a and 129b of relay 130 produces 4.0 volts; winding 125 connected to stationary contacts 131a and 131b of relay 132 produces 2.0 volts; and winding 126 connected to stationary contacts 133a and 133b of relay 134 produces 1.0 volt. The arm of relay 128 is coupled to stationary contact 129b, the arm of relay 130 is coupled to stationary contact 131b, the arm of relay 132 is coupled to stationary contact 133b, and the arm of relay 134 is connected to output terminal 73.

Each of the relays 128, 130, 132, and 134 includes a coil 128a, 130a, 132a and 134a, respectively. One terminal of each coil is grounded while the other is connected to one of the input terminals $18_1$–$18_4$. If none of the relay coils 128a, 130a, 132a, or 134a are energized thereby signifying a zero displacement input signal, the voltage at a given instant of time between terminal 73 and ground is arbitrarily designated as plus 8.0 volts when the ungrounded terminal of winding 123 has a first or positive phase with respect to ground. This may be observed by tracing a path from terminal 73 through relays 134, 132, 130 and 128 to winding 123 and is represented by the voltage 80 in FIG. 3. If terminal $18_4$ is energized, producing a displacement signal of 0.05 inch, relay 134 is picked up switching secondary winding 126 in series opposing with winding 123 resulting in a voltage at output terminal 73 designated as $-1+8=+7$ volts.

The following table gives the output voltage for displacements from 0 to 0.75 inch in increments of 0.05 inch together with the terminals which must be energized to produce them.

| Displacement in Inches | Terminals Energized | Output Voltage at Terminal 23 |
|---|---|---|
| 0 | None | +8.0 |
| 0.05 | $18_4$ | +7.0 |
| 0.10 | $18_3$ | +6.0 |
| 0.15 | $18_3$, $18_4$ | +5.0 |
| 0.20 | $18_2$ | +4.0 |
| 0.25 | $18_2$, $18_4$ | +3.0 |
| 0.30 | $18_2$, $18_3$ | +2.0 |
| 0.35 | $18_2$, $18_3$, $18_4$ | +1.0 |
| 0.40 | $18_1$ | 0 |
| 0.45 | $18_1$, $18_4$ | −1.0 |
| 0.50 | $18_1$, $18_3$ | −2.0 |
| 0.55 | $18_1$, $18_3$, $18_4$ | −3.0 |
| 0.60 | $18_1$, $18_2$ | −4.0 |
| 0.65 | $18_1$, $18_2$, $18_4$ | −5.0 |
| 0.70 | $18_1$, $18_2$, $18_3$ | −6.0 |
| 0.75 | $18_1$ $18_2$, $18_3$, $18_4$ | −7.0 |

In order to provide still smaller increments of displacement, additional relays may be provided such as relay 136, shown in dashed lines, connected to terminal $18_n$. This relay, and all other relays connected to terminals between terminal $18_n$ and $18_4$ would have associated therewith additional secondary windings such as dashed winding 137. The connections between relay 136 and winding 137 are not shown but would be identical to those connecting secondary winding 123–126 to relays 128, 130, 132 and 134.

A significant feature of this invention is that it provides a coarse-fine positional control system having excellent resolution and accuracy without the use of elaborate and complex logical circuitry. This result is achieved by using a linear transducer as a fine feedback element and controlling the output of the transducer by means of the coarse component of the input signal.

As many changes could be made in the above construction and many different embodiments could be made without departing from the scope thereof, it is intended that all matter contained in the above description or shown in the accompanying drawing shall be interpreted as illustrative and not in a limiting sense.

I claim:

1. In a coarse-fine control system for positioning a movable object in accordance with an input signal having coarse and fine signal components, the combination comprising driving means mechanically coupled to said movable object, a fine transducer having a stator winding and at least two movable output windings spatially displaced with respect to each other, said output windings being mechanically coupled to said movable object, comparison means adapted to receive a voltage corresponding to said fine signal component, switching means adapted to receive said coarse signal component, said switching means coupling a selected one of said output windings to said comparison means in accordance with said coarse signal component, and means coupling said comparison means to said driving means.

2. A control system for positioning a movable object in response to an input signal having coarse and fine signal components comprising driving means coupled to said movable object, coarse positioning means responsive to said coarse signal component, said coarse positioning means being mechanically coupled to said movable object, a fine transducer mechanically coupled to said movable object, said fine transducer having a primary winding and a plurality of angularly displaced secondary windings movable relative to said primary winding, comparison means adapted to receive an analog voltage corresponding to said fine signal component, switching means responsive to said coarse signal component, said switching means including a first switching circuit adapted for coupling a selected winding of said plurality of secondary windings to said comparison means and a second switching circuit adapted for selectively reversing the polarity of the voltage across said selected secondary winding, and means for selectively coupling said coarse positioning means and said comparison means to said driving means.

3. A control system as defined in claim 2 wherein the primary winding of said fine transducer is fixed and said plurality of angularly displaced secondary windings comprises a pair of spaced rotating windings mechanically coupled to said movable object.

4. A control system as defined in claim 3 wherein said first and second switching circuits comprise relays having their coils excited by said coarse signal component and said fine transducer produces a substantially linear voltage output.

5. A control system for positioning a movable object in response to a digital input signal having coarse and fine signal components comprising driving means coupled to said movable object, coarse positioning means responsive to said coarse signal component, said coarse positioning means being mechanically coupled to said movable object, fine digital-to-analog converter means adapted to receive said fine signal component, a fine linear transducer having a stator winding and a pair of spaced rotor windings mechanically coupled to said movable object, comparison means coupled to said fine digital-to-analog converter means, switching means responsive to said coarse signal component, said switching means including a first switching circuit adapted for coupling one of said rotor windings to said comparison means and a second switching circuit adapted for reversing the polarity of the voltage applied to said stator winding, and means for selectively coupling said coarse positioning means and said comparison means to said driving means.

6. A control system for positioning a movable object in response to a digital input signal having coarse and fine signal components comprising driving means coupled to said movable object, coarse digital-to-analog converter means adapted to receive said coarse signal component, coarse transducer means coupled to said movable object, fine digital-to-analog converter means adapted to receive said fine signal component, fine transducer means coupled to said movable object, said fine transducer means having a primary winding and a pair of spaced secondary windings, comparison means coupled to said fine digital-to-analog converter means, switching means responsive to said coarse signal component, said switching means including a first switching circuit adapted for coupling one of said secondary windings to said comparison means and a second switching circuit adapted for reversing the polarity of the voltage across said secondary winding, and comparator means coupling said coarse digital-to-analog converter and said coarse transducer to said driving means when the difference signal between the outputs of said coarse converter and coarse transducer exceeds a predetermined value, said comparator means coupling said comparison means to said driving means when said difference signal falls below said predetermined value.

7. A control system for positioning a movable object in response to a digital input signal having coarse and fine signal components comprising driving means coupled to said movable object, coarsed digital-to-analog converter means having at least first and second input terminals adapted to receive said coarse signal component, coarse transducer means coupled to said movable object, fine digital-to-analog converter means adapted to receive said fine signal component, fine transducer means coupled to said movable object, said fine transducer means having a primary winding and a pair of spaced secondary windings, comparison means coupled to said fine digital-to-analog converter means, a first switching circuit coupled to the first input terminal of said coarse digital-to-analog converter means, said first switching circuit being adapted for coupling one of said secondary windings to said comparison means, a second switching circuit coupled to the second input terminal of said coarse digital-to-analog converter means, said second switching circuit being adapted for reversing the polarity of the voltage across said secondary winding, comparator means responsive to the output signals of said coarse digital-to-analog converter and said coarse transducer, said comparator means being adapted to couple said coarse converter and said coarse transducer to said driving means when the difference between the output signals of said coarse converter and coarse transducer exceeds a predetermined value and to couple said comparison means to said driving means when said difference signal falls below said predetermined value.

8. A control system as defined in claim 7 wherein the first input terminal of said coarse digital-to-analog converter means is responsive to the least significant digit of said coarse signal component and the second input terminal of said coarse converter is responsive to the next most significant digit of said coarse signal component.

9. In a control system including driving means for displacing a movable object to a predetermined position in response to an input signal having coarse and fine signal components the combination comprising transducer means coupled to said movable object for measuring the displacement thereof, said transducer means having a primary circuit and a plurality of secondary circuits, comparison means responsive to the fine component of said input signal, said comparison means being coupled to said driving means, and switching means adapted to receive the coarse signal component of said input signal, said switching means selectively coupling the secondary circuits of said transducer means to said comparison means in accordance with the coarse signal component of said input signal.

10. In a coarse servo positioning system responsive to applied coarse input signals for positioning an object in discrete increments of distance, said coarse servo positioning system including servomotor means coupled to said object, position responsive means coupled to said object, and coarse comparator means jointly responsive to the applied coarse input signals and the output from said position responsive means for producing a coarse error control voltage, said coarse error control voltage energizing said servomotor means to position said object; a fine servo positioning system responsive to applied fine input signals for positioning said object in small units of distance less than said discrete increments of distance comprising in combination, a fine position responsive transducer coupled to said object and producing a first output voltage varying according to a first range of units of distance over which said object is to be positioned and a second output voltage varying according to a second range of units of distance over which said object is to be positioned, fine comparator means, switching means coupled between said fine transducer means and said fine comparator means, said switching means being responsive to the applied coarse input singals for selectively coupling one of said first or second output voltages to said fine comparator means, and means coupling the output voltage from said fine comparator means to said servomotor means, said fine comparator means comparing said selected output voltage with the applied fine input signals for producing a fine error control voltage, said fine error control voltage energizing said servomotor means to position said object.

11. A control system for positioning a movable object in response to a digital input signal having coarse and fine signal components comprising driving means coupled to said movable object, first input terminal means adapted to receive said coarse signal component, second input terminal means adapted to receive said fine signal component, a fine transducer coupled to said movable object, said fine transducer being provided with a plurality of output circuits, comparison circuit means, means coupling said comparison circuit means to said second input terminal means, switching means coupled to said first input terminal means and to each of said plurality of output circuits, means coupling said switching means to said comparison circuit means, said switching means selectively coupling one of the output circuits of said fine transducer to said comparison circuit means in accordance with said coarse signal component, and means coupling said comparison circuit means to said driving means.

12. A control system for positioning a movable object in response to an input signal having coarse and fine signal components, comprising driving means coupled to said movable object, coarse positioning means responsive to said coarse signal component and adapted for positioning said movable object, fine feedback means coupled to said movable object, said fine feedback means having a plurality of output circuits, comparison means responsive to said fine signal component, switching means having a plurality of terminals, each of said terminals being connected to a corresponding one of said output circuits, means coupling said switching means to said comparison means, said switching means being adapted to receive said coarse signal component and to selectively couple one of said output circuits to said comparison means, and means for selectively coupling said coarse positioning means and said comparison means to said driving means.

13. In a coarse-fine control system for positioning a movable object in accordance with an input signal having coarse and fine signal components, the combination comprising driving means mechanically coupled to said movable object, a fine transducer coupled to said movable object, said fine transducer having a plurality of output circuits, comparison circuit means responsive to said fine signal components, switching means having a plurality of terminals, each of said terminals being connected to a corresponding one of said output circuits, means coupling said switching means to said comparison circuit means, said switching means being adapted to receive said coarse signal component and to selectively couple one of the output circuits of said fine transducer to said comparison circuit means in accordance with said coarse signal component, said comparison circuit means producing an error voltage for energizing said driving means.

14. A control system for positioning a movable object in response to a digital input signal having coarse and fine components comprising in combination, driving means coupled to said movable object, first input terminal means adapted to receive said coarse signal component, second input terminal means adapted to receive said fine signal component, transducer means coupled to said movable object, said transducer means having an input circuit and a plurality of output circuits, said input circuit being adapted for receiving an applied reference voltage, each of said plurality of output circuits producing an output voltage varying in magnitude according to a predetermined range of positions of said movable object, comparison means, switching means coupled between the plurality of output circuits of said transducer means and said comparison means, means coupling said first input terminal means to said switching means, said switching means being responsive to the coarse component of the digital input signal for selectively coupling one of the output circuits of said transducer means to said comparison means in accordance with the coarse signal component, means coupling said second input termnial means to said comparison means, said comparison means comparing the output voltage from the selected output circuit of said transducer means with the fine component of said digital input signal to produce an error voltage, and means coupling said error voltage to said driving means for positioning said movable object.

15. The control system as defined by claim 14 further comprising an additional switching means coupled to the input circuit of said transducer means, said additional switching means being responsive to an additional coarse component of the digital input signal for reversing the coupling between the input circuit of said transducer means and the applied reference voltage during the presence of the additional coarse component of the digital input signal.

References Cited in the file of this patent

UNITED STATES PATENTS

| | | |
|---|---|---|
| 2,397,922 | Conway | Apr. 9, 1946 |
| 2,808,548 | Spencer | Oct. 1, 1957 |
| 2,840,771 | Kamm | June 24, 1958 |
| 2,843,811 | Tripp | July 15, 1958 |
| 2,848,670 | Kelling et al. | Aug. 19, 1958 |

FOREIGN PATENTS

| | | |
|---|---|---|
| 1,110,544 | France | Oct. 12, 1955 |